(12) United States Patent
Sawai et al.

(10) Patent No.: US 7,009,817 B2
(45) Date of Patent: Mar. 7, 2006

(54) ROTARY MAGNETIC HEAD DEVICE AND METHOD OF PRODUCING A ROTARY MAGNETIC HEAD DEVICE

(75) Inventors: Kunio Sawai, Osaka (JP); Kazuhiro Takahashi, Osaka (JP)

(73) Assignee: Funai Electric Co., Inc., Osaka (JP)

( * ) Notice: Subject to any disclaimer, the term of this patent is extended or adjusted under 35 U.S.C. 154(b) by 523 days.

(21) Appl. No.: 10/209,620

(22) Filed: Jul. 31, 2002

(65) Prior Publication Data

US 2003/0026045 A1 Feb. 6, 2003

(30) Foreign Application Priority Data

| Aug. 6, 2001 | (JP) | 2001-005170 U |
| Mar. 12, 2002 | (JP) | 2002-001289 U |

(51) Int. Cl.
*G11B 21/04* (2006.01)

(52) U.S. Cl. .................................................. 360/271.1
(58) Field of Classification Search .... 360/271.1–271.2
See application file for complete search history.

(56) References Cited

U.S. PATENT DOCUMENTS 5,317,466 A * 5/1994 Hasegawa ................ 360/271.7

FOREIGN PATENT DOCUMENTS

| GB | 2179407 A | * 3/1987 |
| JP | 58-180828 | 10/1983 |
| JP | 1-149213 | 6/1989 |
| JP | 3-30009 | 4/1991 |
| JP | 4-26911 | 1/1992 |
| JP | 4-95206 | 3/1992 |
| JP | 6-82453 | 10/1994 |
| JP | 8-235545 | 9/1996 |

OTHER PUBLICATIONS

Patent Abstracts of Japan, Publication No. 01–124113, May 17, 1989, 2 pages.
Patent Abstracts of Japan, Publication No. 04–026911, Jan. 30, 1992, 2 pages.
Patent Abstracts of Japan, Publication No. 60–129420, Jul. 10, 1985, 2 pages.
Patent Abstracts of Japan, Publication No. 58–180828, Oct. 22, 1983, 2 pages.
Patent Abstracts of Japan, Publication No. 04–095206, Mar. 27, 1992, 2 pages.
Patent Abstracts of Japan, Publication No. 08–235545, Sep. 13, 1996, 2 pages.
Patent Abstracts of Japan, Publication No. 01–149213, Jun. 12, 1989, 2 pages.

* cited by examiner

*Primary Examiner*—George Letscher
(74) *Attorney, Agent, or Firm*—Osha Liang LLP

(57) ABSTRACT

A rotary magnetic head device includes a stationary drum; a rotary drum having a rotary magnetic head; a rotor of a motor fixed to the rotary drum; a support shaft for pivotally supporting the rotary drum, the support shaft having a receiving face; a radial bearing for receiving a radial load, interposed between the rotary drum and the support shaft; a thrust bearing for receiving a thrust load, being slidably put on the receiving face; an urging member for urging the thrust bearing against the receiving face by pushing the rotary drum downward; and a reverse L-shaped support fixed to the stationary drum. The urging member is supported by the reverse L-shaped support and arranged on the rotary drum.

13 Claims, 9 Drawing Sheets

ROTARY MAGNETIC HEAD DEVICE AND METHOD OF PRODUCING A ROTARY MAGNETIC HEAD DEVICE

BACKGROUND OF THE INVENTION

1. Field of the Invention

The present invention relates to a rotary magnetic head device used for a video tape recorder, which will be referred to as "VTR" in this specification, hereinafter. More particularly, the present invention relates to a rotary magnetic head device in which a rotary drum having a magnetic head is supported by a support shaft, which is a stationary shaft, via a bearing.

2. Description of the Related Art

According to Japanese Unexamined Patent Publication No. 58-180828 (Prior Art Example 1), there is a description about a fluid bearing cylinder device having a rotary side unit and stationary side unit. This Prior Art Example 1 describes the fluid bearing cylinder device as follows. A rotary transformer is attached to the stationary side unit, and a permanent magnet is attached to the rotary side unit. When this permanent magnet is opposed to the rotary transformer, a predetermined attraction force is generated in the direction of thrust. A thrust fluid bearing, which generates a bearing force in the direction opposite to the attraction force, is arranged being put on a forward end face of a stationary shaft having grooves. When the attraction force of the permanent magnet and the weight of the rotary side unit are balanced with the bearing force of the fluid bearing, a direction of thrust of the rotary side unit is subjected to positional regulation. Further, the following descriptions are made. The rotary side unit is supported by a stationary shaft via a radial direction fluid bearing which bears a radial load, and the radial direction fluid bearing is formed by spiral grooves made on an outer circumferential face of the stationary shaft. Furthermore the following descriptions are made. The thrust direction fluid bearing and radial direction fluid bearing are formed when lubricant is held on the sliding faces of those bearings.

On the other hand, according to Japanese Unexamined Patent Publication Nos. 4-95206 (Prior Art Example 2) and 4-26911 (Prior Art Example 3), there is a description of a rotary head device having a rotary drum pivotally supported by a support shaft. According to Japanese Examined Patent Publication No. 3-30009 (Prior Art Example 4), there is a description of a dynamic fluid bearing used as a thrust bearing by which abrasion of the thrust member can be reduced as small as possible. Other than Prior Art Example 1 described above, Japanese Unexamined Patent Publication Nos. 8-235545 (Prior Art Example 5) and 1-149213 (Prior Art Example 6) and also according to Japanese Examined Patent Publication No. 6-82453 (Prior Art Example 7) make a description of suppressing the occurrence of abrasion of a thrust bearing.

In Prior Art Examples 1 to 7 described above, Prior Art Example 1 discloses a structure in which the thrust bearing is fixed to the rotary side unit with screws. Prior Art Example 2 discloses the same structure. On the other hand, according to Prior Art Examples 5 to 7, there are no specific descriptions of the means for fixing the thrust bearing to the rotary drum side. According to the structure described in Prior Art Example 4, the thrust bearing is attached to the rotary sleeve by a holding ring composed of a spring sheet. According to the structure described in Prior Art Example 3, the thrust bearing composed of a spherical member is held inside the sleeve member by adjustment screws.

However, in Prior Art Example 1, a force (pressing force) to be balanced with the support force of a fluid bearing is obtained by the attraction force of a permanent magnet. Therefore, the following problems may be encountered.

(1) According to the characteristic of a permanent magnet, the permanent magnet attracts a magnet body. Therefore, the permanent magnet attracts fine magnetic powder mixed in dust. Accordingly, there is a possibility that the initial attraction characteristic of the permanent magnet is impaired. In order to prevent the occurrence of this problem, it is necessary to take specific countermeasure against the problem.

(2) An attraction force of the permanent magnet changes being in inverse proportion to the square of a distance from the permanent magnet to an object to be attracted. Therefore, in the case of Prior Art Example 1 described before, it is necessary to highly accurately adjust a distance from the permanent magnet to the rotary transformer, which is troublesome taking time and labor.

(3) A rotary transformer is attached to the rotary side or stationary side unit, and the permanent magnet is attached to the rotary side unit. Therefore, it is indispensable to incorporate the permanent magnet inside the fluid bearing cylinder. Accordingly, the efficiency of assembling work is impaired and the productivity is deteriorated.

(4) Since the thrust direction fluid bearing and radial direction fluid bearing are formed by feeding lubricant into grooves, it is necessary to conduct maintenance on those fluid bearings so as to maintain the initial performance of them. Further, since the permanent magnet is incorporated inside the fluid bearing cylinder as described above, the maintenance work takes much time and labor.

As described in Prior Art Examples 1 to 7, when the thrust bearing is attached by fasteners such as attaching screws, holding rings or adjusting screws, it is necessary to provide parts to be used as the fasteners. Further, it is necessary to provide a process in which the thrust bearing is attached to the rotary drum and sleeve member, which raises the entire production cost.

Although a sliding face of the thrust bearing is lubricated at all times, since the thrust bearing is usually made of metal, they always demands improvements in the abrasion resistance property. For the above reasons, in order to improve the abrasion resistance property of the sliding face, it is preferable that the thrust bearing is made of synthetic resin, which is called engineering plastic, the sliding property and abrasion resistance property of which are high. However, when the above structure is adopted, since it is common that synthetic resin is not electrically conductive, it is difficult to connect the rotary drum with ground by using the thrust bearing as one of the electrical passage composing members.

SUMMARY OF THE INVENTION

In view of the above circumstances, the present invention has been accomplished to solve the above problems. An object of the present invention is to generate a force in the thrust direction by not a permanent magnet but an urging member when the motor to drive a rotary drum is arranged in an upper portion of the rotary drum.

It is another object of the present invention to easily adjust a force in the thrust direction by generating a force in the thrust direction by an urging member and also it is another object of the present invention to avoid an influence given by dust.

It is still another object of the present invention to arrange an urging member, which generates a force in the thrust direction, in an upper portion of the rotary drum so that the efficiency of assembling work and that of maintenance work can be enhanced.

It is still another object of the present invention to reduce a price of the radial bearing.

It is still another object of the present invention to provide a rotary magnetic head to which the thrust bearing can be attached without using fasteners, which are parts to be separately prepared, such as attaching screws, holding rings and adjusting screws by actively utilizing a rotor of a motor for driving the rotary drum.

According to the present invention, the thrust bearing composed of a synthetic resin body, the abrasion resistance of which is more excellent than that of the thrust bearing made of metal, is used so as to improve the durability of a rotary magnetic head device, however, it is an object of the present invention to provide a rotary magnetic head device in which the rotary drum can be connected with ground by actively utilizing a thrust bearing composed of such a synthetic resin body.

According to one aspect of the present invention, there is provided a rotary magnetic head device including: a stationary drum; a rotary drum having a rotary magnetic head; a rotor of a motor fixed to the rotary drum; a support shaft for pivotally supporting the rotary drum, the support shaft having a receiving face; a radial bearing for receiving a radial load, interposed between the rotary drum and the support shaft; a thrust bearing for receiving a thrust load, being slidably put on the receiving face; an urging member for urging the thrust bearing against the receiving face by pushing the rotary drum downward; and a reverse L-shaped support fixed to the stationary drum, wherein the urging member is supported by the reverse L-shaped support and arranged on the rotary drum.

DETAILED DESCRIPTION OF THE PREFFERED EMBODIMENTS

Figure 1:
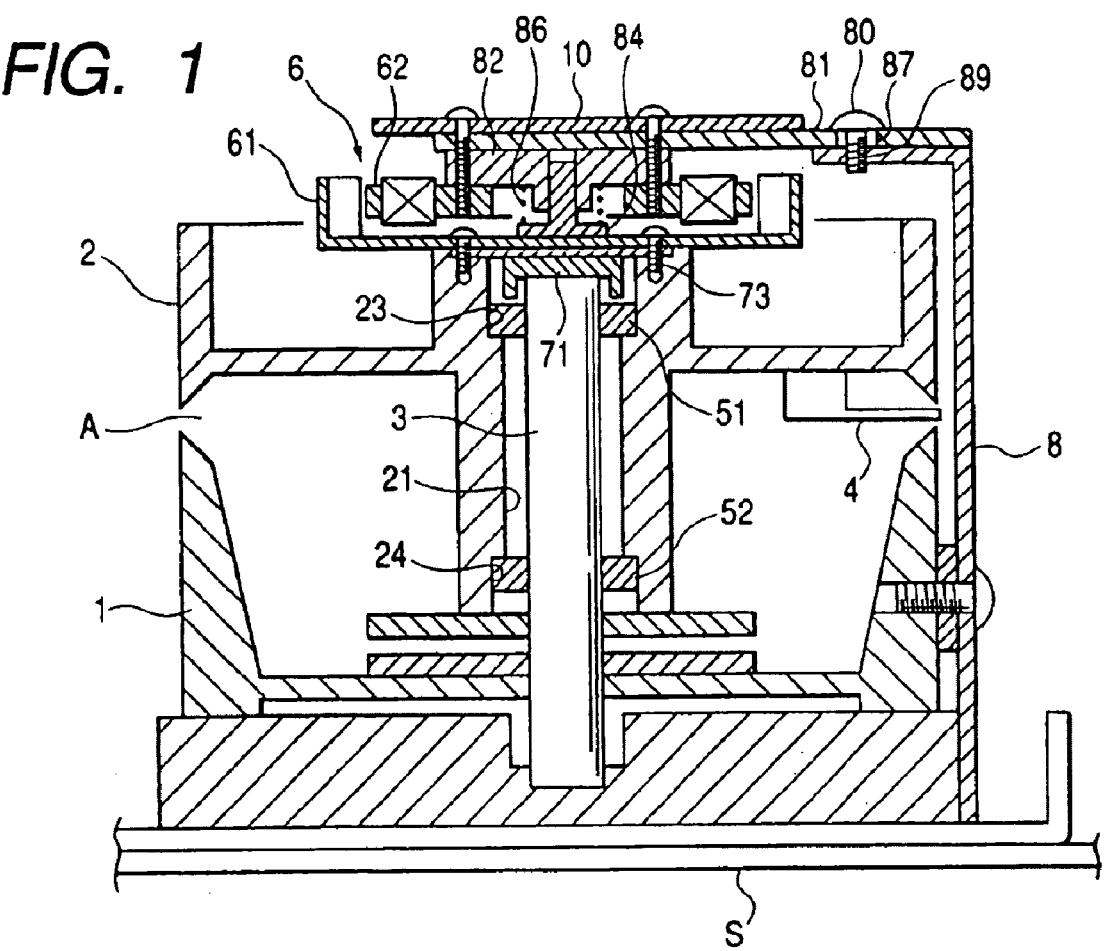
FIG. 1 is a longitudinal sectional side view of a rotary magnetic head device of a first embodiment of the present invention.
Figure 2:
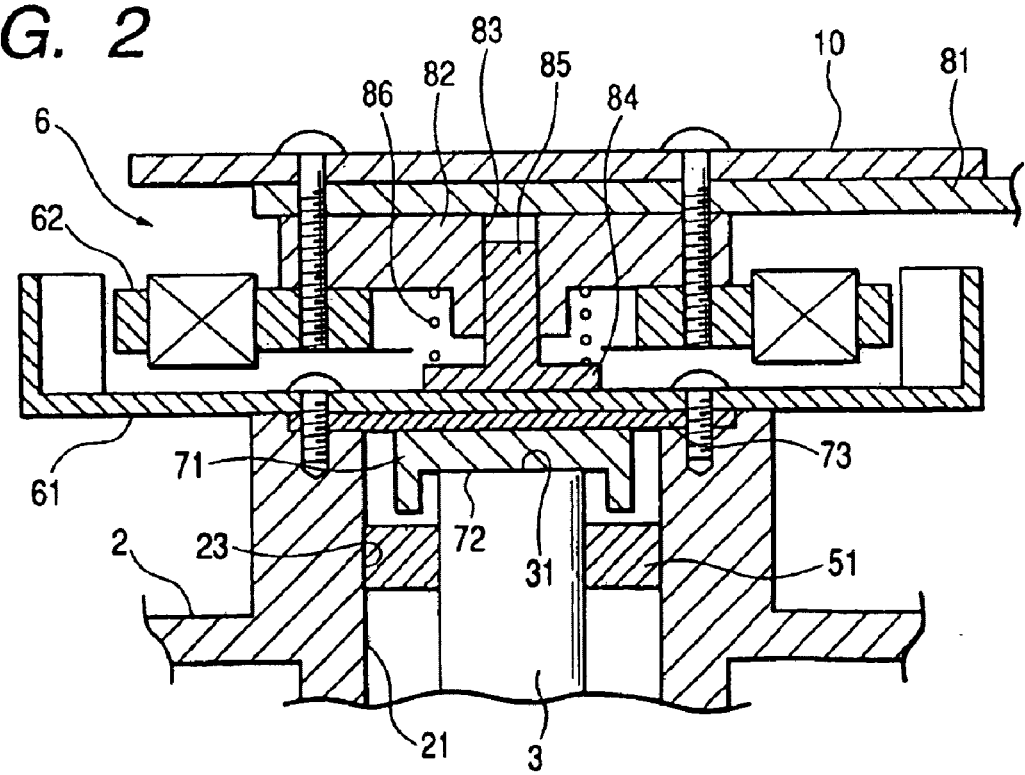
FIG. 2 is an enlarged longitudinal sectional side view of a primary portion of FIG. 1.
Figure 3:
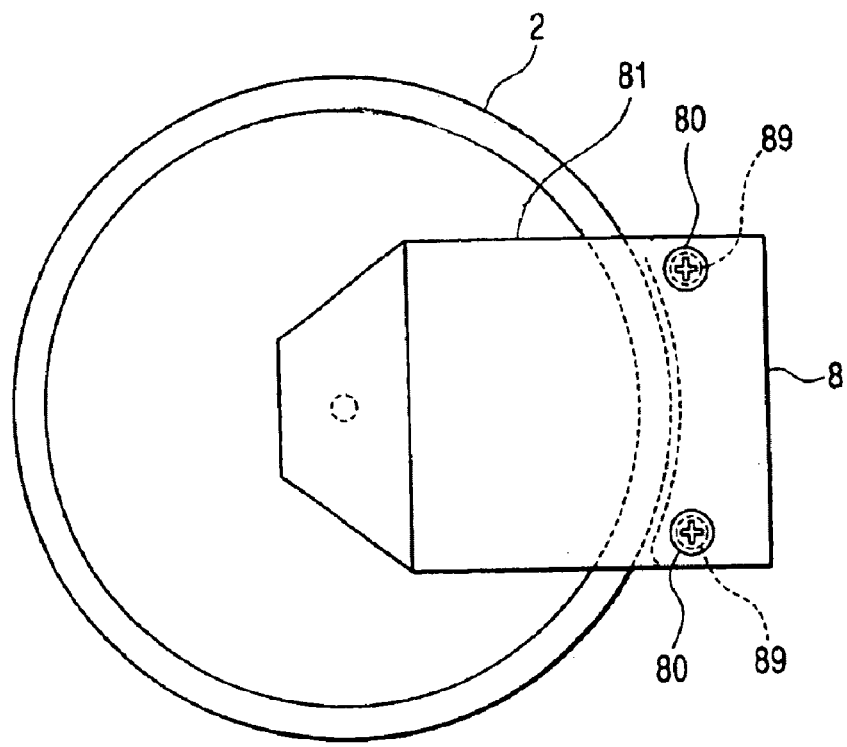
FIG. 3 is a schematic illustration showing a positional relation between an attaching member and a rotary drum, wherein the illustration is taken from above.
Figure 4:
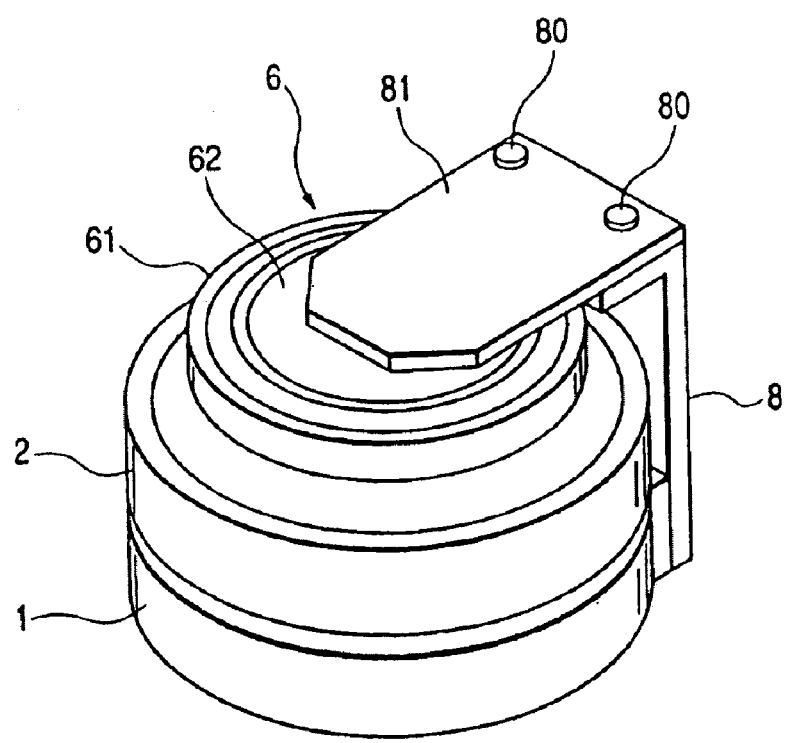
FIG. 4 is a perspective view showing an outline of the rotary magnetic head.
Figure 5:
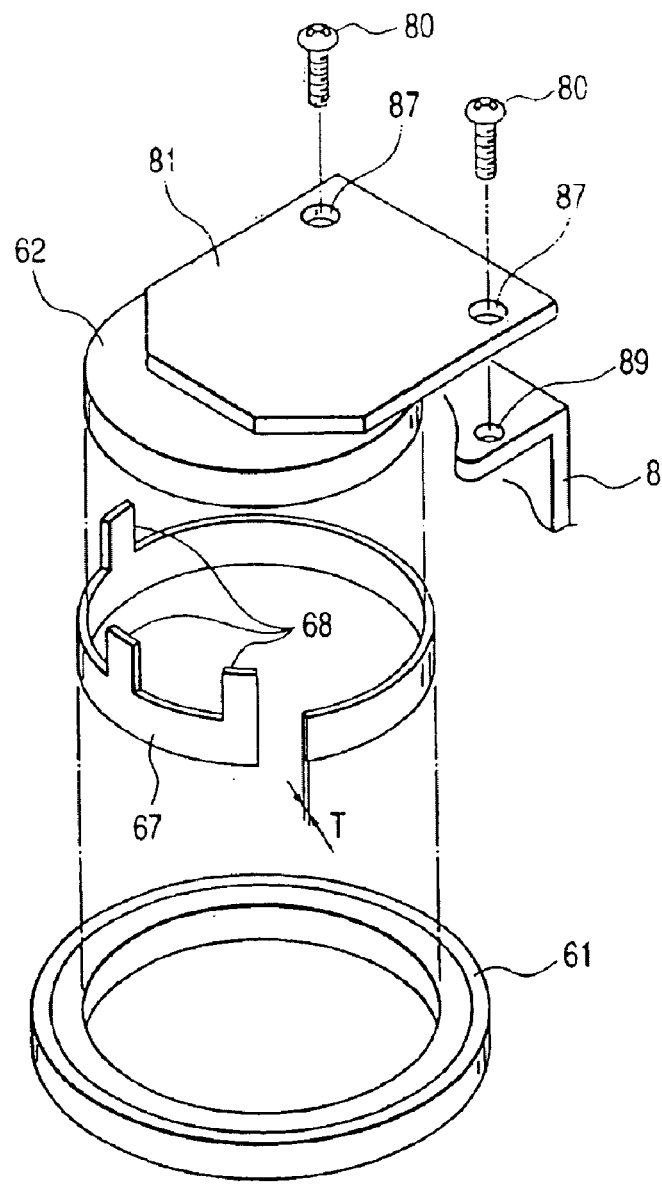
FIG. 5 is an exploded perspective view showing an assembling procedure of a motor and a positioning jig used in the process of assembling.
Figure 6:
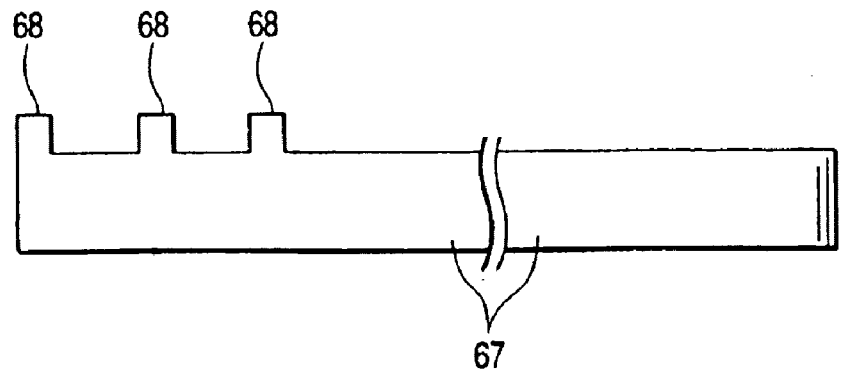
FIG. 6 is a front view of the positioning jig.

FIGS. 1 to 3 are views showing a first embodiment of a rotary magnetic head. FIG. 1 is a longitudinal sectional side view, FIG. 2 is an enlarged longitudinal sectional side view of a primary portion of FIG. 1, and FIG. 3 is a schematic illustration showing a positional relation between an attaching member 81 and a rotary drum 2, wherein the view is taken from above. FIG. 4 is a schematic perspective view of the rotary magnetic head. FIG. 5 is an exploded perspective view showing an outline of the assembling procedure of a motor 6 and also showing an outline of a positioning jig used in an assembling process. FIG. 6 is a front view of the positioning jig.

In FIG. 1, reference numeral 1 designates a stationary drum, reference numeral 2 designates a rotary drum, and reference numeral 3 designates a support shaft used as a stationary shaft. In this structure, a lower end portion of the support shaft 3 is fixed to the stationary drum 1 being press-fitted into it.

The rotary drum 2 includes: a magnetic head 4; a central through-hole 21; and bearing attaching portions 23, 24, the diameters of which are large, which are recess portions formed concentrically with the through-hole 21 in two portions of the through-hole 21, wherein one is an upper portion and the other is a lower portion of the through-hole 21. The radial bearings 51, 52 are respectively press-fitted into the bearing attaching portions 23, 24. These radial bearings 51, 52 are oil impregnated powder sintered bearings in which lubricant is impregnated in a cylindrical sintered metal body. The oil impregnated powder sintered bearing belongs to a fluid bearing. A rotor 61 of the motor 6 described later is concentrically attached to an upper end portion of the rotary drum 2 by screws, and the thrust bearing 71 is fixed to a central lower face of the rotor 61. This thrust bearing 71 is a fluid bearing, on the lower face of which spiral grooves are formed.

When attaching the rotary drum 2, to which the rotor 61 having the thrust bearing 71 is attached, to the support shaft 3, the radial bearings 51, 52, which are press-fitted into the upper 23 and the lower bearing attaching portion 24, are slid in the axial direction from above so that the radial bearings 51, 52 can be engaged with the support shaft 3, and the thrust bearing 71 attached to the rotor 61 is put on an upper end face of the support shaft 3. In this case, the upper end face of the support shaft 3 is formed into the receiving face 31 as shown in FIG. 2. When the rotary drum 2 is attached to the support shaft 3, the upper 51 and the lower radial bearing 52 are engaged with the support shaft 3 at two positions in such a manner that the bearings 51, 52 can be freely slid in the axial direction and freely rotated in the circumferential direction, and the support shaft 3 is accommodated in the through-hole 21 of the rotary drum 2, and further the sliding face 72 of the thrust bearing 71 is slidably put on the receiving face 31. Then, the magnetic head 4 is set in gap A formed between the stationary drum 1 and the rotary drum 2 as shown in FIG. 1.

As shown in FIG. 2 which is an enlarged view, there is provided a spacer 73, which is a disk-shaped body, between the rotor 61 and the thrust bearing 71. This spacer is adopted for the object of adjusting the height level of the magnetic head 4. Therefore, as long as the above gap A can be appropriately formed and the magnetic head 4 can be appropriately set in the above gap A without using the spacer 73, the spacer 73 may be omitted and the thrust bearing 71 may be directly fixed to the rotor 61.

Next, as shown in FIGS. 1, 3 and 4, there is vertically provided a support, or a support body 8 in the back portion (rear portion) of the stationary drum 1. A plate-shaped attaching member 81 is connected with an upper end portion of this support body 8. At the connecting portion of the support body 8 with the attaching member 81, attaching screws 80, which are idly engaged in insertion holes 87 of large diameters formed on the attaching member 81, are screwed. This attaching member 81 is arranged at a predetermined position above the rotary drum 2. According to the above structure, when the attaching screws 80 are loosened, the attaching member 81 and the attaching screws 80 can be displaced in the insertion holes 87 of large diameters of the attaching member 81 in any direction. Therefore, the position of the attaching plate 81 can be freely adjusted in the horizontal direction. When the positional adjustment is conducted in this way, a stator (described later) of a motor 6 attached to this attaching member 81 can be highly accurately positioned with respect to a rotor 61. In this attaching member 81, the stator 62 of the motor 6 is attached onto the lower face of the attaching member 81, and a wiring board 10 having an earth circuit is attached onto the upper face of the attaching member 81. Further, as shown in FIG. 2, a holder 82 is attached to the attaching member 81. a shaft 85 of a pressing member 84 is slidably engaged in a hole 83 formed in this holder 82 in such a manner that the shaft 85 can be slid in the vertical direction. Further, a coil spring 86 is interposed being compressed between the pressing member 84 and the holder 82 in the hole 83.

In the rotary magnetic head device composed as described above, when the rotor 61 of the motor 6 is rotated, the rotary drum 2 is rotated together with the rotor 61, and the magnetic head 4 runs in a circular passage in gap A. Further, a magnetic tape (not shown) runs being wound round the stationary drum 1 and the rotary drum 2. A radial load generated by the rotation of the rotary drum 2 is supported by the radial bearings 51, 52 which are arranged at two positions, wherein one is an upper position and the other is a lower position. A thrust load generated by the rotation of the rotary drum 2 is supported by the thrust bearing 71. An elastic force of the coil spring 86 is transmitted to the thrust bearing 71 via the pressing member 84 and the rotor 61. Therefore, the thrust bearing 71 is pressed against the receiving face 72. Therefore, the rotary drum 2 can be smoothly rotated without causing vibration. Due to the foregoing, vibration of the magnetic head 4 can be suppressed.

In this embodiment, the attaching member 81 is connected with the support body 8 vertically attached to the back of the stationary drum 1, and the stator 62 of the motor 6 for driving the rotary drum 2 is attached to the attaching member 81. On the other hand, the rotor 61 of the motor 6 is attached to an upper portion of the rotary drum 2. Due to the above structure, it becomes possible to generate a force in the thrust direction by the coil spring 86 arranged in the upper portion of the rotary drum 2. Therefore, if a spring constant of the coil spring 76 is appropriately determined, an intensity of the force in the thrust direction can be easily adjusted.

In this embodiment, the motor 6 can be assembled from an upper portion of the rotary drum 2. Referring to FIGS. 5 and 6, the assembling procedure will be exemplarily explained below. When the motor 6 is assembled, the positioning jig 67, which is shown in FIG. 6 and functions as a spacer, is used. This positioning jig 67 is composed of a belt-shaped resin film which can be easily bent, however, the rigidity of which is appropreately high. At a plurality of upper end edge portions of the positioning jig 67, there are provided a plurality of handle pieces 68. Thickness T of the positioning jig 67 is identical with the width of a gap space, which must be appropriately ensured, formed between the rotor 61 and the stator 62.

In the case of assembling, the positioning jig 67 is curved into a circle as shown in FIG. 5 and engaged with the rotor 61 which is fixed to the rotary drum 2 (shown in FIG. 1) by screws, so that the positioning jig 67 can be set along the inner circumferential face of the rotor 61. Next, the stator 62 attached to the attaching member 81 is engaged inside the positioning jig 67, the shape of which is kept circular. Due to the foregoing, by the positioning action of the positioning jig 67 as a spacer, the center of the rotor 61 and that of the stator 62 accurately coincide with each other, so that the width of the gap space to be ensured between the rotor 61 and the stator 62 can be set uniformly and highly accurately in the circumferential direction. Next, the attaching screw 80 is inserted into the attaching screw insertion hole 87 of the attaching member 81 from above and screwed and fastened into the screw hole 89 formed in the support body 8. After that, any of the plurality of handle pieces 68 of the positioning jig 67, which protrude upward from the gap formed between the rotor 61 and the stator 62, is pulled so as to draw out the positioning jig 67 from the gap. An assembled state is schematically shown in FIG. 4.

When the motor 6 is assembled in the way described above, the gap space between the rotor 61 and the stator 62 can be highly accurately set. Therefore, vibration caused by the rotation of the rotor 61 can be suppressed. Further, since the motor 6 can be assembled by the assembling work conducted from an upper portion of the rotary drum 2, the property of assembling work can be improved. After the completion of assembling, when the attaching screws 80 are removed and the attaching member 81 is detached from the support body 8, maintenance can be conducted on a portion around the coil spring 86 without disassembling the rotary drum 2 and other components. Further, an intensity of the force in the thrust direction given by the coil spring 86 does not change even if dust adheres to the coil spring 86. For the above reasons, there is no possibility that the initial performance is impaired by the influence of dust adhering to the coil spring 86. Further, since the oil impregnated powder sintered bearings are used for the radial bearings 51, 52, it becomes possible to use inexpensive radial bearings in this embodiment compared with the radial bearings used in Prior Art Example 1 explained at the beginning of this specification. Furthermore, since a pressing force is given to the thrust bearing 71 by the inexpensive spring body 86, the cost of production of the means for giving the pressing force can be reduced as compared with the case of Prior Art Example 1 in which the permanent magnet is used. Furthermore, since the support body 8 can be held by a hand, it is possible for an operator to handle the rotary magnetic head without touching the stationary drum 1 and the running face (outer circumferential face) of the rotary drum 2.

Figure 7:
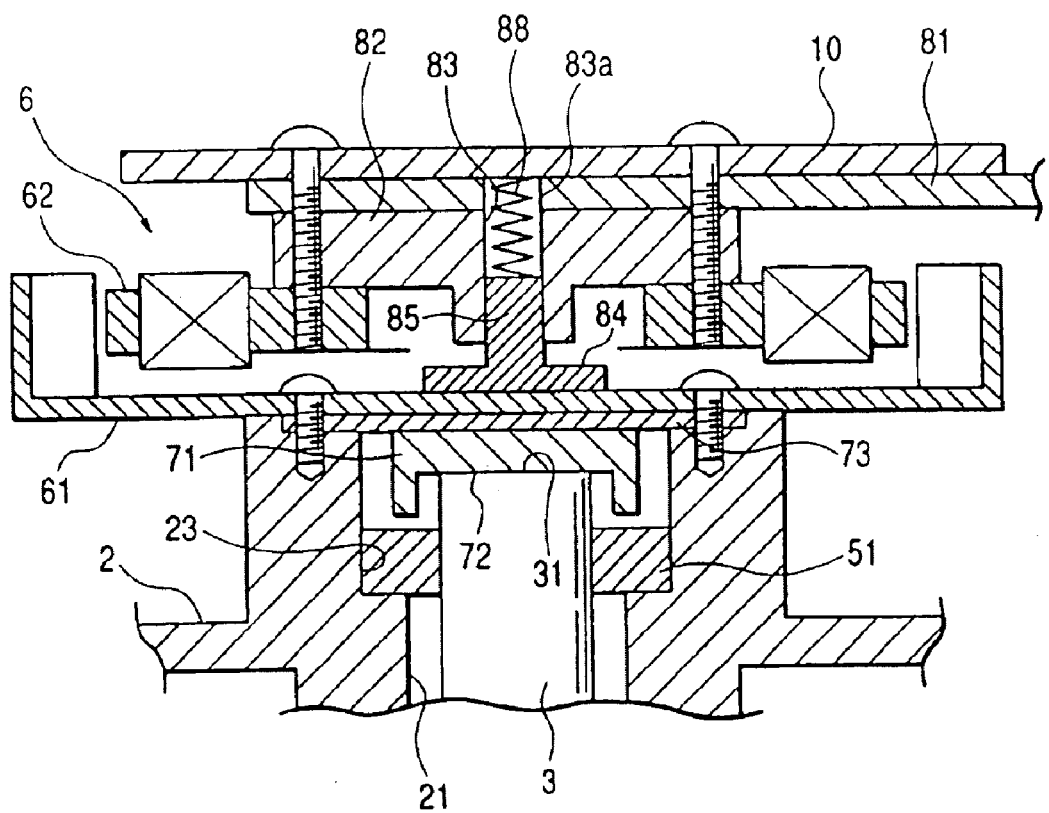
FIG. 7 is a sectional view showing a variation of a primary portion of the first embodiment.

FIG. 7 is a view showing a variation of the primary portion of this embodiment. As shown in the view, in the attaching member 81, there is provided an opening 83a communicating with the hole 83 of the holder 82. An earth circuit (not shown) of the wiring board 10 faces this opening 83a. In this structure, the coil spring 86 explained in FIGS. 1 and 2 is omitted. Instead of the coil spring 86, the coil spring 88 accommodated in the hole 83 of the holder 82 is interposed being compressed between the shaft 85 of the pressing member 84 and the earth circuit of the wiring board 10. In this connection, the pressing member 84 and the coil spring 88 are made of conductive material. In this embodiment, the pressing member 85, the coil spring and the holder 82 constitute an urging member.

According to this embodiment, the rotor 61 and the rotary drum 2 are electrically short-circuited to the earth circuit of the wiring board 10 by the pressing member 84 and the coil spring 88. Therefore, it is unnecessary to provide a specific wiring for short-circuiting the rotor 61 and the rotary drum 2 to the earth circuit of the wiring board 10.

Other points of the structure and operation are the same as those explained referring to FIGS. 1 to 6. In order to avoid to make overlapping explanations, the same reference characters are used to indicate like parts in various views, and the detailed explanations are omitted here.

In the embodiments described above, the rotary drum 2 is attached to the support shaft 3 vie the two radial bearings 51, 52, wherein one is an upper radial bearing and the other is a lower radial bearing. However, the number of the radial bearings is not limited to two, that is, the rotary drum 2 can be also attached to the support shaft 3 by only one radial bearing.

Figure 8:
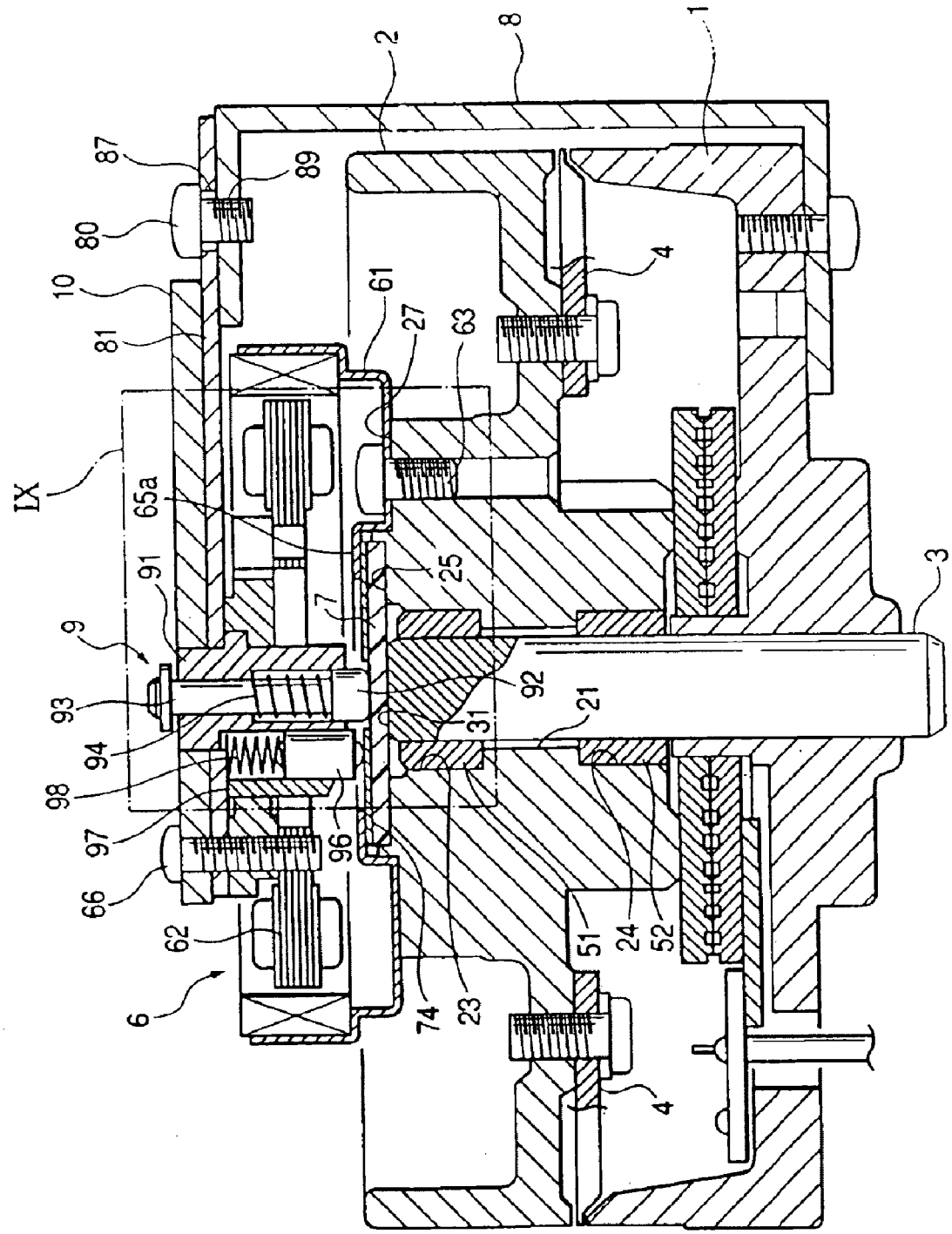
FIG. 8 is a longitudinal sectional side view of a rotary magnetic head device of a second embodiment of the present invention.
Figure 9:
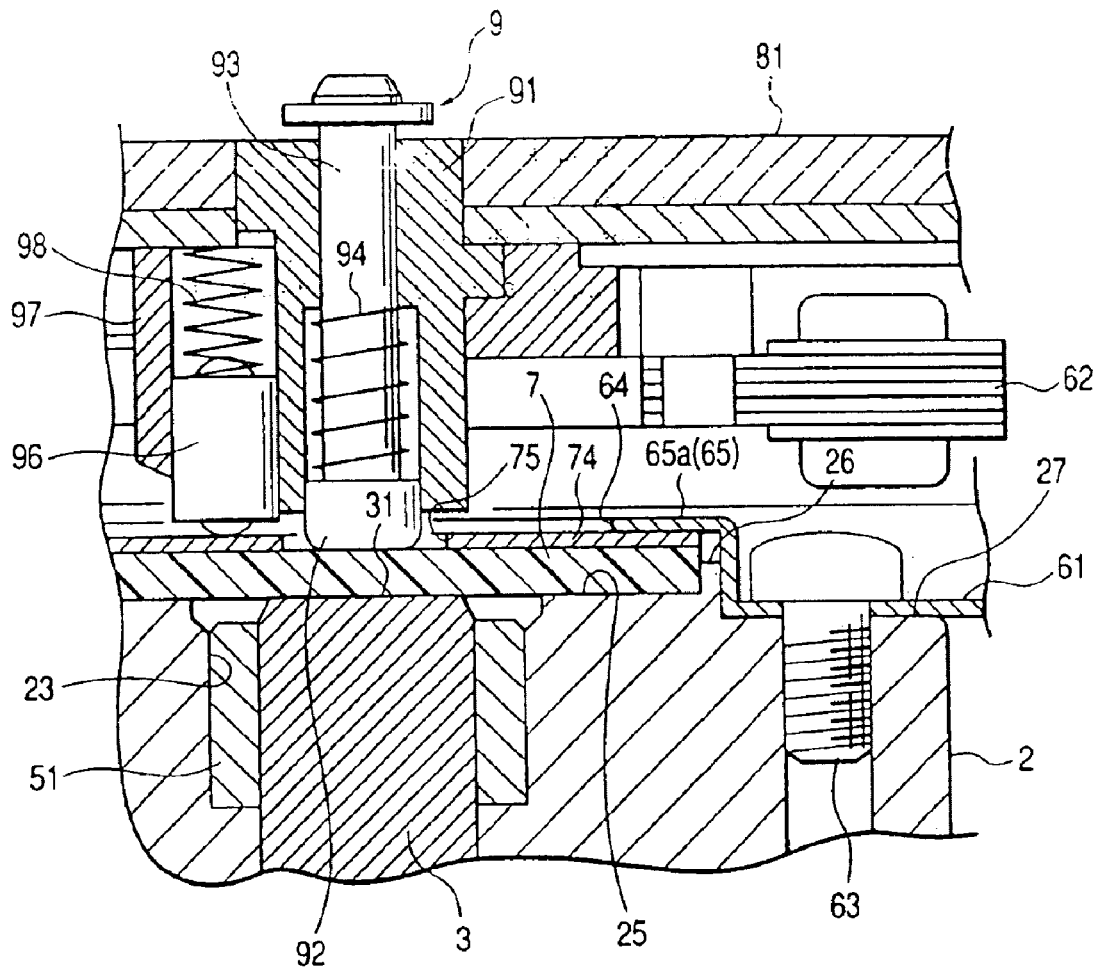
FIG. 9 is an enlarged longitudinal sectional side view of portion IX of FIG. 8.
Figure 10:
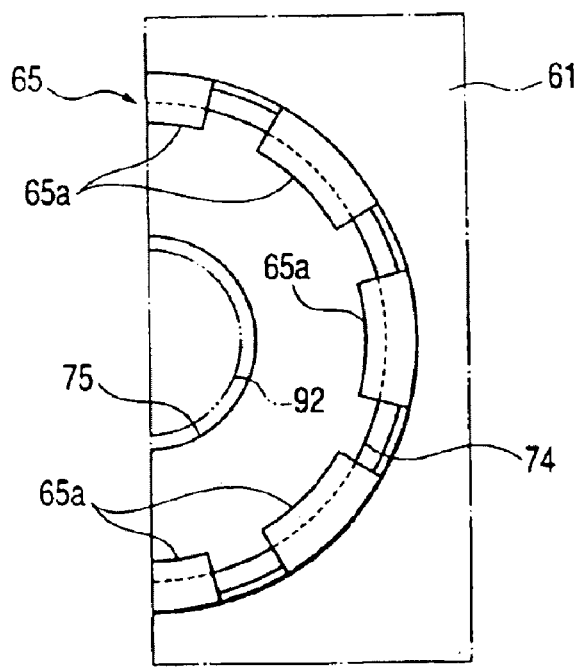
FIG. 10 is a schematic illustration showing a state in which the holding piece portion of a rotary frame and an annular electrode of a thrust bearing are put on each other.

FIGS. 8 to 10 are views showing a rotary magnetic head of the second embodiment of the present invention. FIG. 8 is a longitudinal sectional side view showing an outline of the rotary magnetic head, FIG. 9 is an enlarged longitudinal sectional side view showing portion IX of FIG. 8, and FIG. 10 is a schematic illustration showing a state in which a holding piece portion of the rotor frame and an annular electrode of the thrust bearing are put on each other.

In FIG. 8, reference numeral 1 designates a stationary drum, reference numeral 2 designates a rotary drum, and reference numeral 3 designates a support shaft used as a stationary shaft. In this structure, a lower end portion of the support shaft 3 is fixed to the stationary drum being press-fitted into it.

As shown in FIG. 8, the rotary drum 2 includes: a magnetic head 4; a central through-hole 21; and bearing attaching portions 23, 24, the diameters of which are large, which are recess portions formed concentrically with the through-hole 21 in two portions of the through-hole 21, wherein one is an upper portion and the other is a lower portion of the through-hole 21. The radial bearings 51, 52 are respectively press-fitted into the bearing attaching portions 23, 24. These radial bearings 51, 52 are oil impregnated powder sintered bearings in which lubricant is impregnated in a cylindrical sintered metal body.

As shown in FIGS. 8 and 9, a central portion of the upper end face of the rotary drum 2 is formed into a flat circular attaching face 25, and a annular rib 26 protrudes to the circumference of this attaching face 25. A thrust bearing 7, the shape of which is formed into a disk-shape, which is made of synthetic resin called engineering plastic having a high sliding and abrasion resistance property, is tightly engaged in a recess surrounded by the rib 26. A lower face of this thrust bearing 7 is put on the attaching face 25. On an upper face of this thrust bearing 7, there is provided an annular electrode 74 composed of a conductive metallic plate.

In the rotary drum 2, there is provided an annular flat attaching portion 27 outside the rib 26. A rotor 61 of the motor 6, which will be described later, is attached to this attaching portion 27 by attaching screws 63. The rotor 61 includes a circular central hole 64 and a holding piece portion 65 defining the central hole 64. As shown in FIG. 10, the holding piece portion 65 is composed of a plurality of protruding pieces 65a which are annularly arranged at regular angular intervals in the hole edge portion of the central hole 64. These protruding pieces 65a are put on a plurality of portions in the circumferential direction of the outer circumference of the annular electrode 74 provided in the thrust bearing 7. In the above structure, an outer circumferential portion of the thrust bearing 7 can be interposed between the individual protruding pieces 65a forming the holding piece portion 65 and the attaching face 25 of the rotary drum 2. Therefore, a force impressed upon the thrust bearing 7 can be uniformly given to any portion of the thrust bearing 7 in the circumferential direction. That is, on the assumption that the holding piece portion 65 is integrally formed into an annular shape, an unbalanced load tends to be given to the thrust bearing 7 due to deformation and warp of the holding piece portion 65. When the unbalanced load is given to the thrust bearing 7, the rotary drum 2, which is attached to the thrust bearing 7, becomes unstable, and vibration tends to occur in the rotation of the rotary drum 2. However, when the holding piece portion 65 is divided into a plurality of pieces 65a which are annularly arranged at regular angular intervals like this embodiment, the outer circumferential portion of the thrust bearing 7 can be interposed between the individual protruding pieces 65a and the attaching face 25 of the rotary drum 2. Therefore, a force to hold the thrust bearing 7 interposed between the individual protruding pieces 65a and the attaching face 25 of the rotary drum 2 can be uniformly given to any portion of the thrust bearing in the circumferential direction. Therefore, the rotary drum 2 can be stably set with respect to the thrust bearing 7, which enhances the stability of operation of the magnetic head 4 in the case of reading and writing.

In the rotary drum 2 to which the radial bearings 51, 52 and the thrust bearing 7 are attached, when the upper 51 and the lower radial bearing 52 are slid along and engaged with the support shaft 3 in the axial direction from above and the thrust bearing 7 is put on the receiving face 31 formed on an upper end face of the support shaft 3, the rotary drum 2 can be pivotally supported by the support shaft 3. When the rotary drum 2 is attached to the support shaft 3 in this way, the rotary magnetic head 4 faces a gap formed between the stationary drum 1 and the rotary drum 2 as shown in FIG. 8. A lower face of the disk-shaped thrust bearing 7, which is interposed between the attaching face 25 of the rotary drum 2 and the holding piece portion 65 of the rotor 61, is put on the receiving face 31 of the support shaft 3. Therefore, the attaching face 25 of the rotary drum 2 can be set at the same level as that of the receiving face 31 formed by the upper end face of the support shaft 3. Therefore, even if the thickness of the thrust bearing 7 fluctuates, a relative position of the rotary drum 2 with respect to the support shaft 3 can be made constant at all times. Accordingly, a position of the magnetic head 4 provided in the rotary drum 2 can be highly accurately determined. In this connection, the following structure may be adopted. Spiral grooves are formed on at least one of the receiving face 31 of the support shaft 3 and the sliding face of the thrust bearing 7, and lubricant is held in the spiral grooves, and the receiving face 31 of the support shaft 3 and the sliding face of the thrust bearing 7 are lubricated by the lubricant. Further, it is possible to use an oil impregnated powder sintered bearing for the thrust bearing 7.

As shown in FIG. 8, at the back of the stationary drum 1, there is vertically provided a support body 8. The attaching member 81, which is a metallic plate fixed to an upper end portion of this support body 8 by screws, is arranged in an upper portion of the rotary drum 2 being opposed to it. The support body 8 is electrically connected with a chassis not shown in the drawing. An urging member 9, brush electrode 96 and stator 62 of the motor 6 are attached to the attaching member 81. In this constitution, the urging member 9 is composed as follows. A pressing member, or a rod 93 having a pushing portion 92 at its lower end is engaged in a sleeve 91, which is fixed to the attaching member 81, in such a manner that the rod 93 can be freely moved upward and downward in the sleeve 91. When the rod 93 is pushed downward by a coil spring 94 arranged in the sleeve 91, the pushing portion 92 is elastically contacted with the center of the thrust bearing 7 from the opening 74 of the annular electrode 74. The lower end portion of the rod 93 is formed spherical and substantially comes into point contact with the center of the thrust bearing 7. The brush electrode 96 is held by a guide member 97 in such a manner that the brush electrode 96 can be freely moved upward and downward. Further, the brush electrode 96 comes into elastic contact with an unbalanced portion of the annular electrode 74 at all times by a spring 98 which is composed of a coil spring accommodated in the guide member 97.

In the rotary magnetic head device composed as described above, when the rotor 61 of the motor 6 is rotated, the rotary drum 2 is rotated together with the rotor 61, and the magnetic head 4 runs in a circular passage. Further, a magnetic tape runs being wound round the stationary drum 1 and the rotary drum 2. A radial load generated by the rotation of the rotary drum 2 is supported by the radial bearings 51, 52 which are arranged at two positions, wherein one is an upper position and the other is a lower position. A thrust load generated by the rotation of the rotary drum 2 is supported by the thrust bearing 7 which is put on the receiving face 31 of the support shaft 3. In this case, an elastic force of the coil spring 94 is transmitted to the thrust bearing 7 via the pushing portion 92 of the rod 93. Therefore, the thrust bearing 7 is pressed against the receiving face 31 of the support shaft 3. Therefore, the rotary drum 2 can be smoothly rotated without causing vibration. Due to the foregoing, vibration of the magnetic head 4 can be suppressed.

According to this embodiment, it is possible to provide the effects explained in the first embodiment. Further, it is possible to provide the following effects. Since the thrust bearing 7 is interposed between the holding piece portion 65 of the rotor 61, which is attached to the rotary drum, 2 and the attaching face 25 of the rotary drum 2, when the thrust bearing 7 is attached to the rotary drum 2, it is unnecessary to use fasteners, which must be separately provided, such as attaching screws, holding rings and adjusting screws. Accordingly, the number of parts can be reduced, and further the assembling process can be simplified, and the production cost can be reduced.

The holding piece portion 65 of the rotor 61 is put on and electrically contacted with the annular electrode 74 arranged in the thrust bearing 7, and the brush electrode 96 electrically connected with the chassis via the attaching member 81 and via the spring body 98 comes into elastic contact with the annular electrode 74 at all times. Therefore, although the thrust bearing 7 is composed of a synthetic resin molding body which is an electrically insulating body, the thrust bearing is actively utilized and the rotary drum 2 can be connected to the earth. Since thrust bearing 7 is composed of a synthetic resin molding body, the abrasion resistance property can be improved as compared with a case in which thrust bearing 7 is made of metal.

Since the brush electrode 96, the urging member 9 and stator 65 of the motor 6 are attached to one attaching member 81, it is unnecessary to provide parts used for attaching the above components.

Figure 11:
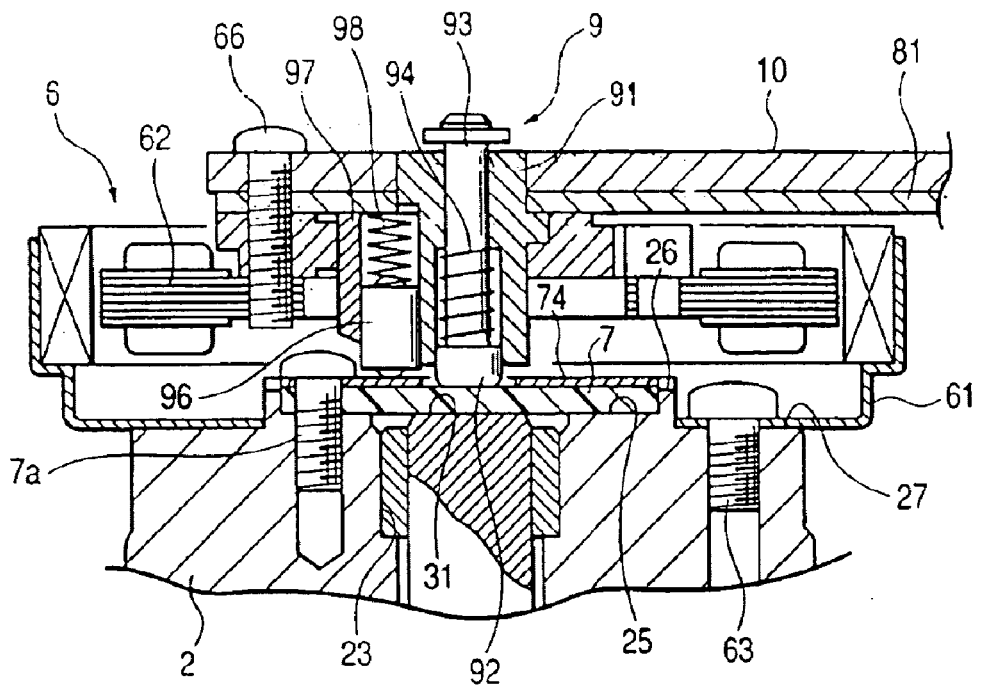
FIG. 11 is a sectional view showing a variation of a primary portion of the second embodiment.

FIG. 11 is a view showing a variation of the rotary magnetic head device explained referring to FIGS. 8 to 10. In this variation, the rotor 61 of the motor 6 is put on the attaching portion 27 provided outside the rib 26 of the rotary drum 2, and the holding piece portion 65 explained in FIGS. 8 to 10 is omitted. The thrust bearing 7 and the annular electrode 74, which is put on the thrust bearing 7, are attached to the attaching face 25 of the rotary drum 2 with the attaching screws 7a. Other points of the structure are the same as those of the rotary magnetic head device explained in FIGS. 8 to 10. According to this structure, it is not necessary for the rotor 61 to be provided with the holding piece portion 65. Therefore, the profile of the rotor 61 can be simplified and the production cost can be reduced.

Figure 12:
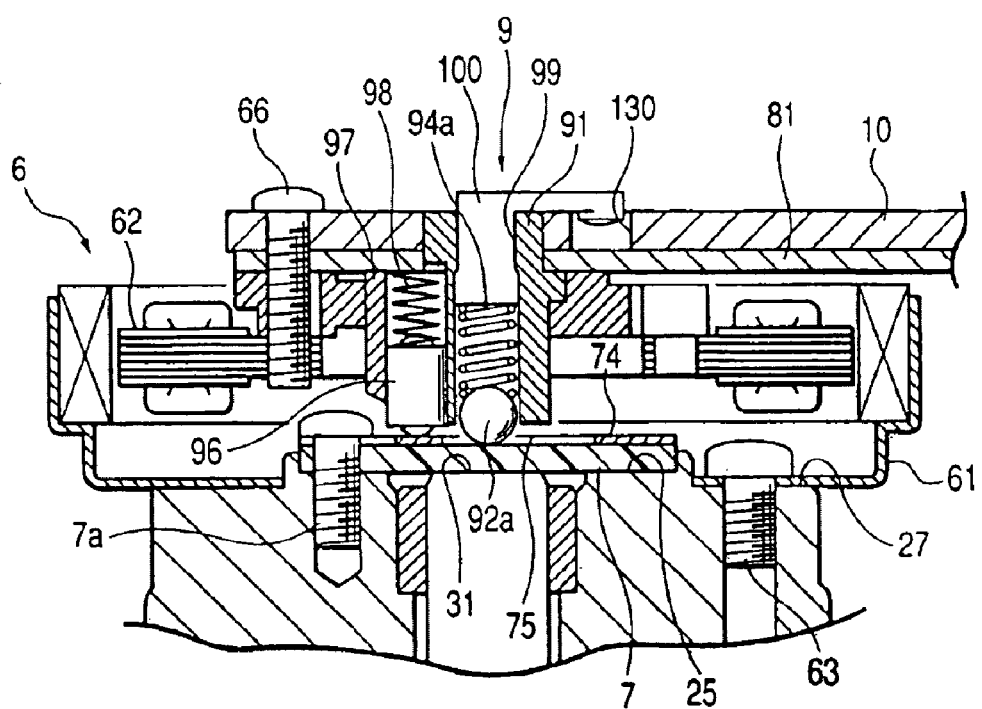
FIG. 12 is a sectional view showing a variation of another primary portion of the second embodiment.

FIG. 12 is a view showing a variation of the rotary magnetic head device explained in FIG. 11. The structure of the urging member 9 of this example is different from that of the urging member shown in FIG. 11. In this example, the urging member 9 is composed as follows. In a sleeve 91 fixed to the attaching member 81, there are provided a spherical pushing body 92a and a coil spring 94a arranged in the sleeve 91. When the pushing body 92a is pushed downward by the coil spring 94a, the pushing body 92a comes into elastic contact with the center of the thrust bearing 7 from the opening 7 of the annular electrode 74. In this connection, a coil spring 94a is held inside the sleeve 91 by a support body 100 attached to the sleeve 91. In this example, when the pushing body 92a is formed into a sphere as described, the center of the thrust bearing 7 can be pushed by the pushing body 92a coming into point contact. Therefore, it is possible to prevent an unbalanced load from being given to the thrust bearing 7. Accordingly, the occurrence of partial abrasion of the thrust bearing 7 can be suppressed, and the generation of vibration by the thrust bearing 7 can be suppressed.

Figure 13:
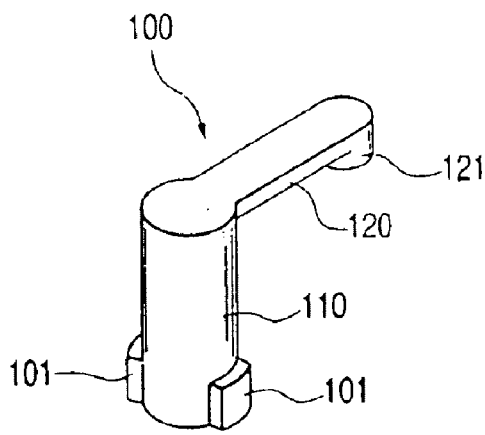
FIG. 13 is a perspective view of the support body.
Figure 14:
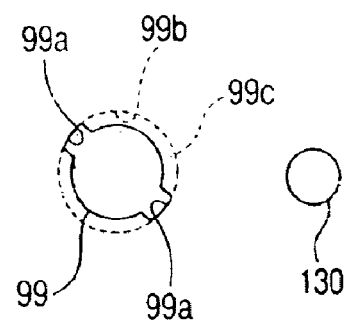
FIG. 14 is a schematic illustration showing a profile of a hole formed in a sleeve.

FIG. 13 is a perspective view of the support body 100, and FIG. 14 is a view showing a profile of the hole 99 of the sleeve 91. As shown in FIG. 13, the support body 100 has an arm 120 which is arranged at an upper end portion of the shaft 110, on the outer circumference at the lower end of which two protrusions 101 are provided. At an end portion of the arm 120, there is provided an engaging protrusion 121. On the other hand, the hole 99 of the sleeve 91 has a stretching portion 99a, which is formed at the entrance of the sleeve 91, into which the protrusion 101 can be inserted. Further, a lower end side portion of the hole 99 in the axial direction is formed into a large diameter portion 99b. After the shaft 110 is inserted into the hole 99 while the protrusion 101 of the support body 100 is being set at the stretching portion 99a of the hole 99, the shaft 110 is rotated, and then the protrusion 101 is engaged with the step face 99c at an upper end portion of the large diameter portion 99b, so that the shaft 110 can be prevented from coming out. As shown in FIGS. 12 and 14, the engaging hole 130 is formed on the wiring board 10 attached to the attaching member 81. When the engaging protrusion 121 of the support body 100 is engaged in this engaging hole 130, it becomes possible to prevent the occurrence of a case in which the shaft 110 comes out from the hole 99 of the sleeve 91 when the support body 100 is unexpectedly rotated.

Figure 15:
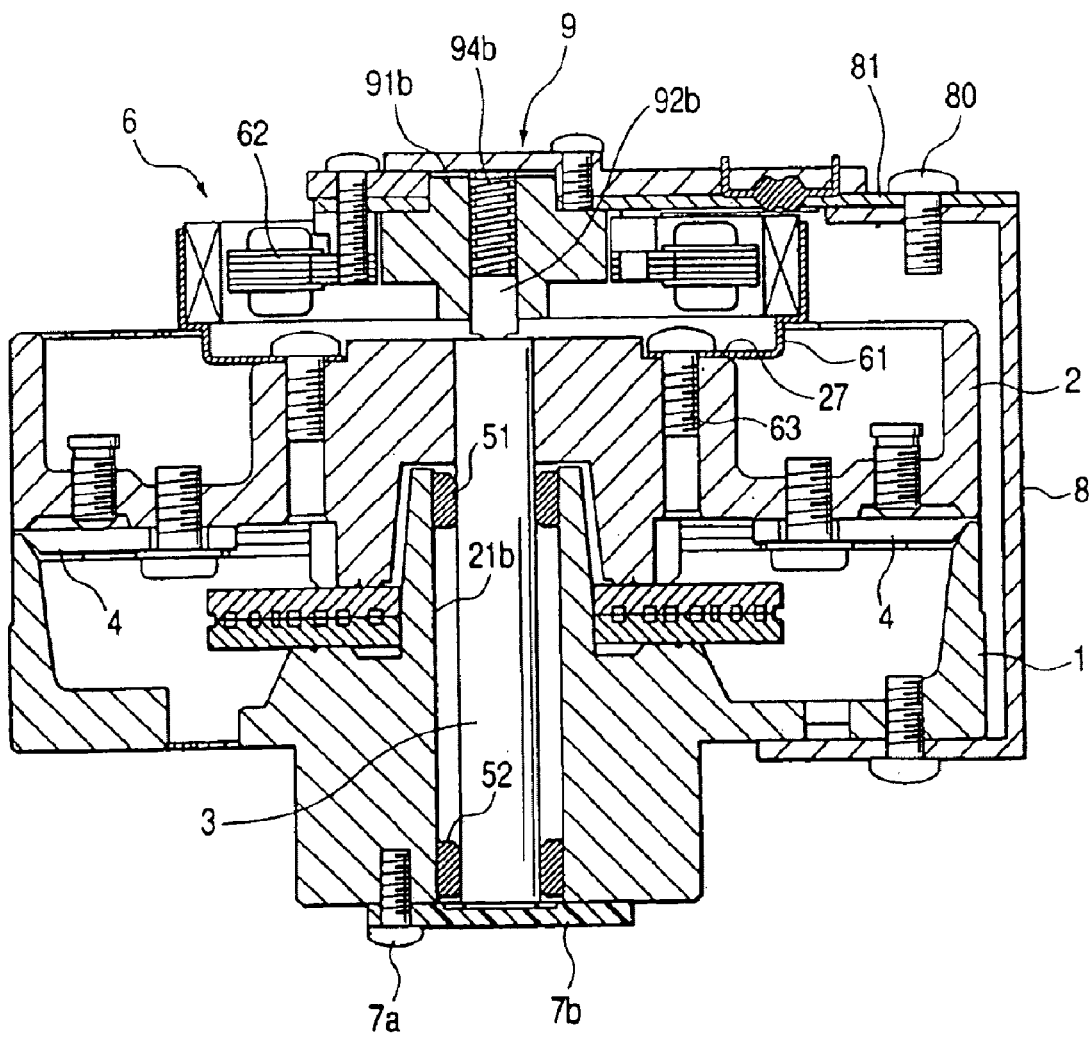
FIG. 15 is a longitudinal sectional side view of a rotary magnetic head device of a third embodiment of the present invention.

FIG. 15 is a view showing a rotary magnetic head of the third embodiment of the present invention.

In FIG. 15, reference numeral 1 designates a stationary drum, reference numeral 2 designates a rotary drum, and reference numeral 3 designates a support shaft used as a rotary shaft. In this structure, an upper end portion of the support shaft 3 is fixed to the rotary drum 2 being press-fitted into it.

As shown in FIG. 15, the stationary drum 1 includes a central through-hole 21b. The radial bearings 51, 52 are respectively press-fitted into the two portions of the through-hole 21b, wherein one is an upper portion and the other is a lower portion of the through-hole 21b. These radial bearings 51, 52 are oil impregnated powder sintered bearings in which lubricant is impregnated in a cylindrical sintered metal body.

In the rotary drum 2, there is provided an annular flat attaching portion 27 outside the rib 26. A rotor 61 of the motor 6, which will be described later, is attached to this attaching portion 27 by attaching screws 63.

The rotary drum 2 is attached to the stationary drum 1 in which the radial bearings 51, 52 are disposed. The support shaft 3 is inserted in the radial bearings 51, 52. The lower end surface of the support shaft 3 is received by a thrust bearing 7b which is attached to the lower surface of the stationary drum 1. The thrust bearing 7b is fixed to the stationary body 1 by a screw 7a.

At the back of the stationary drum 1, there is vertically provided a support body 8. The attaching member 81, which is a metallic plate fixed to an upper end portion of this support body 8 by screws 80, is arranged in an upper portion of the rotary drum 2 being opposed to it. In this constitution, the urging member 9 is composed as follows. A pressing member 92b is engaged in a holder 91b, which is fixed to the attaching member 81, in such a manner that the pressing member 92b can be freely moved upward and downward in the holder 91b. The pressing member 92b is pushed downward by a coil spring 94b arranged in the holder 91b. The pressing member 92b urges the support shaft 3 toward the center of the thrust bearing 7b.

In the rotary magnetic head device composed as described above, when the rotor 61 of the motor 6 is rotated, the rotary drum 2 is rotated together with the rotor 61, and the oil impregnated in the radial bearings 51, 52 come out, so that the capability of the radial bearings 51, 52 are maintained for long time.

Figure 16:
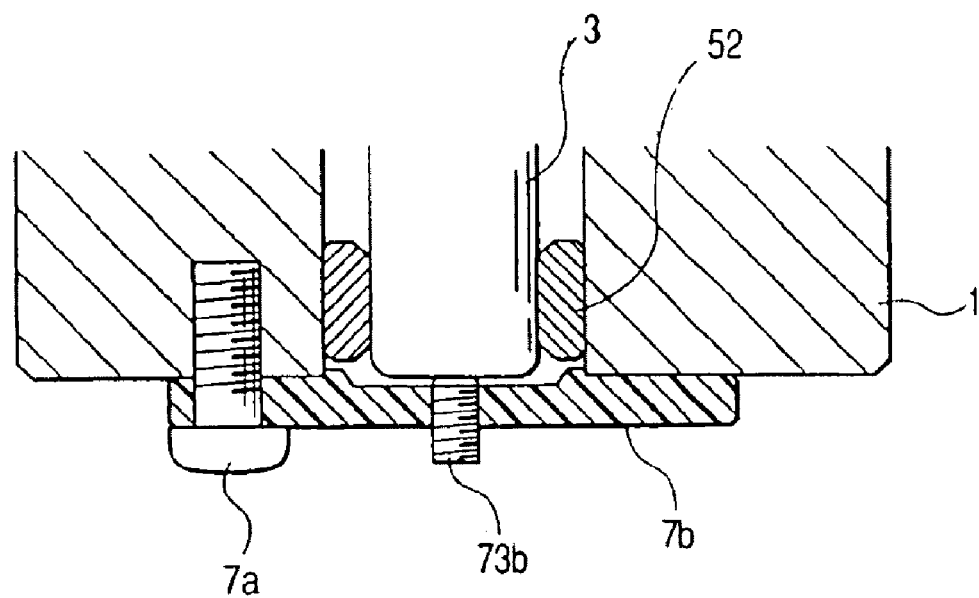
FIG. 16 is a sectional view showing a variation of a primary portion of the third embodiment.

FIG. 16 is a view showing a variation of the rotary magnetic head device explained in FIG. 15. In this example, a spacer, or a screw 73b penetrates the thrust bearing 7b. An upper end portion of the screw 73 abuts the lower end surface of the support shaft 3. A lower end portion of the screw protrudes from the lower surface of the thrust bearing.

Figure 17:
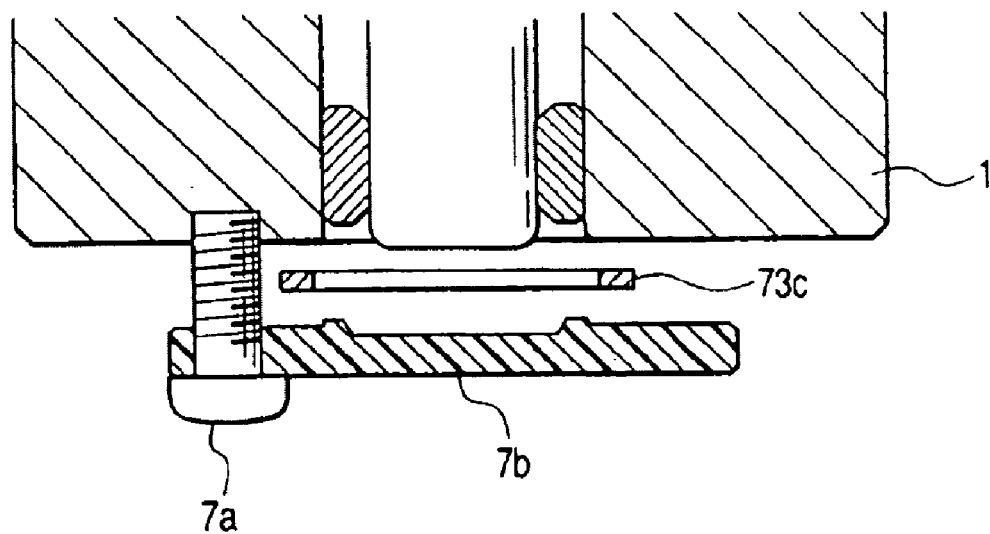
FIG. 17 is a sectional view showing a variation of another primary portion of the third embodiment.

FIG. 17 is a view showing another variation of the rotary magnetic head device explained in FIG. 15. In this example, a spacer, or a ring 73c is interposed between the thrust bearing 7b and the stationary body 1.

The same reference characters are used to indicate like parts in FIGS. 1 to 17.

What is claimed is:

1. A rotary magnetic head device comprising:

a stationary drum;

a rotary drum having a rotary magnetic head, a through hole and bearing attaching portions concentrically formed at an upper and a lower position of the rotary drum, the rotary drum being arranged at an upper side of the stationary drum;

a support shaft for pivotally supporting the rotary drum, accommodated in the through-hole, having a receiving face on an upper end face thereof;

a radial bearing composed of a fluid bearing interposed between the support shaft and the rotary drum;

a rotor of a motor fixed to the rotary drum;

a thrust bearing composed of a fluid bearing for receiving a thrust load, the thrust bearing being fixed to the rotor, the thrust bearing being slidably set on the receiving face in an upper portion of the through-hole;

a spacer for adjusting a height level of the rotary magnetic head, the spacer being interposed between the thrust bearing and the rotor;

a support body vertically arranged at the back of the stationary drum;

an attaching member fixed to an upper end portion of the support body with attaching screws, the attaching member being arranged at a predetermined position in an upper portion of the rotary drum;

a stator of the motor, attached to the attaching member;

a wiring board necessary for motor control, attached to the attaching member;

a pressing member attached to the attaching member being capable of moving upward and downward, the pressing member being slidably put on the rotor; and a coil spring interposed between the pressing member and the attaching member, the coil spring pushing the rotary drum downward via the pressing member and the rotor so as to press the thrust bearing downward against the receiving face, wherein the radial bearing is composed of two oil impregnated powder sintered radial bearings which are respectively press-fitted into the bearing attaching portions, and these radial bearings are engaged with the upper and the lower position of the support shaft being capable of freely sliding in the axial direction and freely rotating in the circumferential direction.

2. A rotary magnetic head device comprising:

a stationary drum;

a rotary drum having a rotary magnetic head;

a rotor of a motor fixed to the rotary drum;

a support shaft for pivotally supporting the rotary drum, the support shaft having a receiving face;

a radial bearing for receiving a radial load, interposed between the rotary drum and the support shaft;

a thrust bearing for receiving a thrust load, being slidably put on the receiving face;

an urging member for urging the thrust bearing against the receiving face by pushing the rotary drum downward; and a reverse L-shaped support fixed to the stationary drum, wherein the urging member is supported by the reverse L-shaped support and arranged on the rotary drum.

3. The rotary magnetic head device according to claim 2, wherein the urging member utilizes an elastic force generated by a coil spring.

4. The rotary magnetic head device according to claim 3, the urging member including: a pressing member attached to the attaching member being capable of moving upward and downward, the pressing member being put on the rotor, the pressing member being capable of slidably rotating with respect to the rotor; and a coil spring interposed between the pressing member and the attaching member.

5. The rotary magnetic head device according to claim 4, wherein the pressing member is composed of a conductive body, a wiring board necessary for motor control is attached to the attaching member, and a conductive passage formed by the pressing member, coil spring, attaching member and support is connected with a chassis to which the stationary drum is attached.

6. The rotary magnetic head device according to claim 3, the urging member including: a sleeve fixed to the attaching member; a coil spring accommodated in the sleeve; and a spherical pushing body, wherein the thrust bearing is pressed against the receiving face by pushing the pushing body downward by the coil spring.

7. The rotary magnetic head device according to claim 2, wherein the radial bearing includes a fluid bearing which is engaged in a bearing attaching portion provided in the rotary drum being press-fitted into the bearing attaching portion and also engaged with the support shaft in such a manner that the radial bearing can freely slide in the axial direction and freely rotate in the circumferential direction.

8. The rotary magnetic head device according to claim 7, wherein the rotary drum is provided with a through-hole capable of accommodating the support shaft, and the thrust bearing includes a fluid bearing which is put on the receiving face in the through-hole.

9. The rotary magnetic head device according to claim 8, wherein the fluid bearing composing the radial bearing is an oil impregnated powder sintered bearing.

10. The rotary magnetic head device according to claim 2, wherein the stationary drum is arranged at the lower side of the rotary drum, and the attaching member is fixed by an attaching screw to an upper end portion of the support which is vertically arranged at the back of the stationary drum.

11. The rotary magnetic head device according to claim 10, wherein each of the attaching member and the support has an insertion hole, into which the attaching scre is inserted,
wherein a diameter of the insertion hole of the attaching member is larger than a diameter of the screw, or alternatively a diameter of the insertion hole of the support is larger than a diameter of the screw.

12. A rotary magnetic head device comprising:
a stationary drum;
a rotary drum having a rotary magnetic head;
a rotor of a motor fixed to the rotary drum;
a support shaft for pivotally supporting the rotary drum, the support shaft having a receiving face;
a radial bearing for receiving a radial load, interposed between the stationary drum and the support shaft;
a thrust bearing for receiving a thrust load, being slidably put on the receiving face;
an urging member for urging the support shaft downward against the thrust bearing; and
a reverse L-shaped support fixed to the stationary drum, wherein the urging member is supported by the reverse L-shaped support and arranged on the rotary drum.

13. A method of producing a rotary magnetic head device, the rotary magnetic head device comprising: a stationary drum; a rotary drum having a rotary magnetic head, arranged on an upper side of the stationary drum; a support shaft for pivotally supporting the rotary drum, accommodated in a through-hole formed in the rotary drum; a radial bearing composed of a fluid bearing interposed between the support shaft and the rotary drum; a rotor of a motor fixed to the rotary drum; a thrust bearing composed of a fluid bearing for receiving a thrust load, the thrust bearing being fixed to the rotor, the thrust bearing being slidably set on a receiving face formed on an upper end face of the support shaft in an upper portion of the through-hole; a spacer for adjusting a height level of the rotary magnetic head, the spacer being interposed between the thrust bearing and the rotor; a support body vertically arranged at the back of the stationary drum; an attaching member fixed to an upper end portion of the support body with attaching screws, the attaching member being arranged at a predetermined position in an upper portion of the rotary drum; a stator of the motor and a wiring board necessary for motor control attached to the attaching member; a pressing member attached to the attaching member being capable of moving upward and downward, the pressing member being slidably put on the rotor; and a coil spring interposed between the pressing member and the attaching member, the coil spring pushing the rotary drum downward via the pressing member and the rotor so as to press the thrust bearing against the receiving face,
the method of producing the rotary magnetic head device comprising:
engaging a positioning jig circularly with an inner circumferential face of the rotor fixed to the rotary drum;
engaging the stator attached to the attaching member with the inside of the positioning jig;
fixing the attaching member by the attaching screws after the position of the attaching member has been adjusted at an upper end portion of the support; and
disengaging the positioning jig from between the rotor and the stator.

* * * * *